Figure 1:
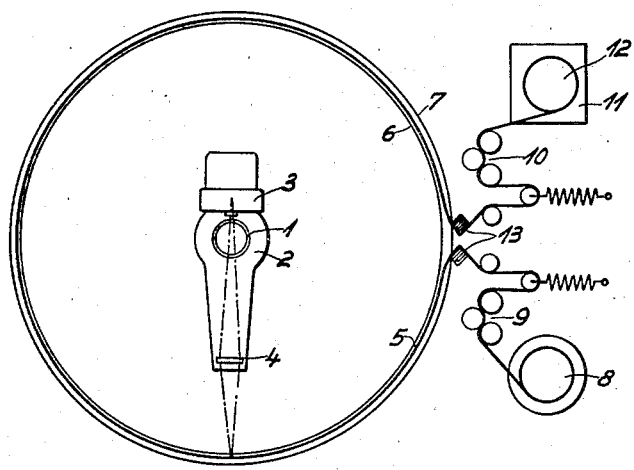

July 12, 1932.                E. RIECKMANN                1,867,176
OSCILLOGRAPH
Filed July 10, 1930        2 Sheets-Sheet 1

Inventor:
Erich Rieckmann
by
Lorra & Kehlenbeck
Attorneys.

July 12, 1932.  E. RIECKMANN  1,867,176
OSCILLOGRAPH
Filed July 10, 1930   2 Sheets-Sheet 2

Inventor:
Erich Rieckmann
by Lotka & Kellenbeck
Attorneys.

Patented July 12, 1932

1,867,176

UNITED STATES PATENT OFFICE

ERICH RIECKMANN, OF BERLIN-CHARLOTTENBURG, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

OSCILLOGRAPH

Application filed July 10, 1930, Serial No. 467,117, and in Germany June 18, 1929.

My invention relates to oscillographs.

The oscillographs known in the art are in principle so constructed that a stationary source of light throws its light by means of a condenser lens and a slit located behind it in the shape of a band of light on to the mirror of a likewise stationary measuring loop of thin strip of metal traversed by the current, bifilar oscillograph, from which mirror it is reflected and brought to a focus by an interposed cylindrical lens, the spot of light tracing a curve or oscillogram on the sensitized film travelling along in front. The film is as a rule wound on a drum housed in a box or case sealed against the entrance of light. This known arrangement has various defects, particularly if the results have to be quickly analyzed and high film velocities are required. For quick work the frequent exchange of the film is particularly inconvenient as it calls for a number of attendants, while at higher velocities the film does no longer lie smoothly upon the drum and the results obtained are inaccurate.

The object of my invention is to eliminate the enumerated defects in oscillographs in which the oscillations are transmitted optically to a sensitized film by a loop of thin metal strip controlled by an alternating current field. This end in view is primarily attained by making the film stationary in relation to the revolving optical system. The individual constituents of the oscillograph are preferably so arranged that the optical system revolves in a drum around the circumference of which is wrapped the film for receiving the oscillograms.

The driving shaft for the optical system is journaled in the end walls of the stationary film drum. The stationary arrangement of the film drum has the advantage that after an oscillogram has been taken the film may be immediately exchanged without the necessity of stopping the oscillograph which would involve a considerable loss of time. The exchange of the film may take place in such a way that every time an oscillogram has been completed a fresh portion of the film is drawn over the shell of the stationary drum which due to the comparatively large circumference of the drum in which the optical system revolves is of considerable length so that the number of joints of the films to be connected is reduced and in this way a saving effected in the time required for analysing the films. A particularly advantageous design of the oscillograph with a view to facilitating the exchange of films consists in drawing the film off a magazine reel whence it is taken over the drum containing the optical system and then passed into a storage case or directly into the developing apparatus. The feeding of the film takes place in such a way that after an oscillogram is finished the drum carrying the film is rotated once whereupon the fresh film portion can be clamped in position by a special device.

According to another embodiment of my invention the revolving optical system is designed as hollow shaft through which the light is able to pass from a source of light located in alignment with its axis and after deflection is projected on the bifilar suspended mirror which may likewise be located within or adjacent to the hollow shaft.

Instead of revolving the oscillograph mirrors with the optical system they may also be kept stationary which might be desirable when only a small space is available. It is then, however, necessary to provide in front of the revolving portion of the optical system a reversing prism revolving at half the speed which makes the oscillating beam reflected by the oscillograph mirror follow in correspondence with the angular displacement between the revolving optical system and the bifilar suspensions. Other details of my invention will be described with reference to the drawings affixed to my specification and forming part thereof.

Figure 3:
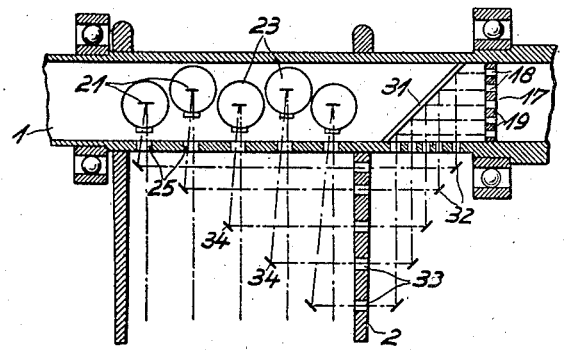
Figure 4:
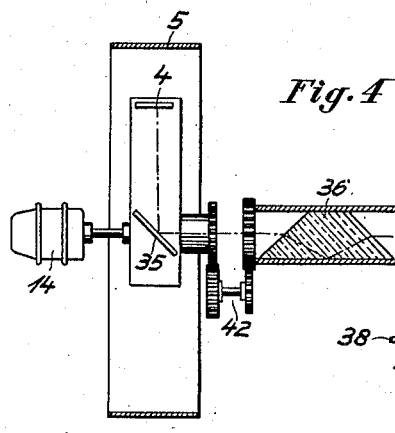
Figure 2:
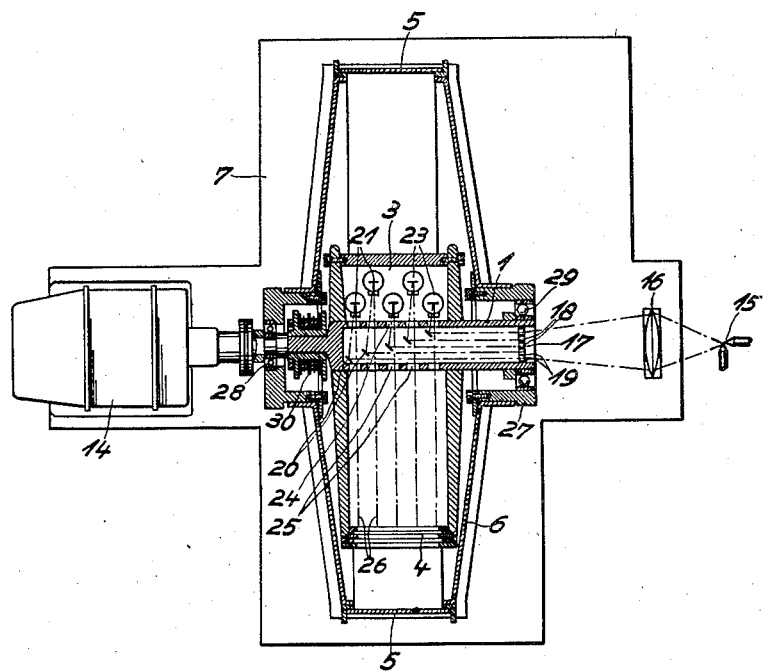

The drawings show a number of embodiments of my invention. In the drawings:

Fig. 1 is a diagram of the arrangement of the various constituent parts of my improved oscillograph, Fig. 2 a section through my oscillograph in the direction of the axis of the film carrying drum, Fig. 3 a cross-section through my oscillograph in which the bifilar suspensions are housed within the hollow driving shaft, and Fig. 4 a further embodiment in which the bifilar suspensions of the mirrors are stationary in relation to the revolving optical system.

Referring to Fig. 1 of the drawings, 1 is a revolving shaft upon which is mounted a casing 2 which in a lateral extension 3 carries the system of magnets and the loop or bifilar suspension of the oscillograph mirror. At the opposite end of the casing or housing 2 there is provided a cylindrical lens 4 in the outlet opening for the rays of light. This lens contracts the narrow band of light reflected by the oscillograph mirror into a focus or point of light which is thrown on to the film 5 from the inside. To allow the light from the oscillograph mirror to be thrown on to the cylindrical lens it is necessary to provide an opening in the driving shaft 1 or the shaft must not be allowed to pass completely through the casing 2. The film 5 is stretched or wrapped around a drum 6 enclosed in a stationary housing 7 sealed against the entry of light. The film is pulled off a magazine reel 8 and passed over guide rollers 9 to the drum 6 and hence over further guide rollers 10 to a storage box 11 in which it is wound up on a reel 12. The fixing of the film on the drum 6 takes place by means of clamping jaws 13 by which the film is simultaneously creased or otherwise embossed or marked so that each individual oscillogram is identified thereby. Instead of the box 11 a developing apparatus may be located here designed in the manner of developers in automatic photographic cameras so that the development of the film takes place entirely automatically.

The taking of oscillograms is effected in such a manner that after fixing the film on the drum 6 the jaws 13 are tightened up and the optical system is then set in rotation by means of the driving shaft 1, the drum 6 and the film remaining stationary at this time. Since the speed of rotation of the system of lenses may be chosen comparatively high the time for taking an oscillogram is very short. The speed of rotation should preferably not be higher than 50 meters per second since in bifilar suspensions, vibrating at maximum speeds the natural period amounts to as much as 5 millimeters so that when taking oscillograms of switching operations the true course of the switching-in and switching-out current curves can no longer be clearly distinguished. After an oscillogram is finished the clamping jaws 13 are released again and the drum turned to such an extent that an unexposed strip of film is then located upon the drum. The exchange of the film can take place automatically, and the developing equipment may simultaneously be set in operation. The clamping jaws are then tightened up again and provide the film with a crease or other embossed mark, the apparatus then being ready for taking a further oscillogram. Since the drum carrying the film is stationary while taking an oscillogram the time wasting and complicated stopping of the revolving carried drum as required heretofore is unnecessary and the oscillograms may be taken in close succession.

A preferred construction of the revolving optical system is illustrated in Fig. 2 of the drawings, in which the housing for the system is shown in cross-section. The drive of the shaft 1 takes place by means of a motor 14 located at the side and preferably outside the closed casing 7.

Opposite to it on the other side of the casing 7 in alignment with the axis of the shaft is located the source of light 15 the light of which is projected through a condenser lens 16 on to a lens member 17 composed of a number of individual lenses 18 between which there are located screening strips or webs 19. The number of lenses corresponds with the number of oscillograph mirrors. The lens member 17 is placed into the inlet opening of the hollow shaft 1. From there the individual bands of light are projected on to small mirrors 20 which reflect them on to the mirrors 21 suspended in the loops 23. These bifilar systems 23 are located laterally of the shaft in the compartment 3 of the housing and are in registry with openings 24 of the hollow shaft 1 so arranged that the beam of light 26 serving as indicator is able to pass through them as well as coinciding further openings 25 on to the cylindrical lens 4. The cylindrical lens contracts the bands of light into points of light so that the movement caused by the bifilar mirrors is reproduced as waves on the film 5.

The guide drum 6 for the film is mounted on a hub 27 in which the shaft 1 revolves in ball-bearings 28 and 29. At the motor end of the shaft 1 collector rings 30 are provided which supply the current to be measured to the measuring loops carrying the oscillograph mirrors.

In the embodiment of my invention illustrated in Fig. 3 of the drawings the loops 23 are located within the hollow shaft 1. To enable the rays of light to pass from the lens member 18 to the bifilar mirrors, a mirror 31 inclined under an angle of 45° is inserted into the tubular shaft, from which mirror the rays of light are projected on to the mirrors 32 and hence through openings 33 in the wall of the housing 2 on to further stationary mirrors 34 which in their turn throw the beam of light on the mirrors of the bifilar suspension or oscillograph mirrors through openings 25 of the hollow shaft.

To obtain a satisfactory illumination of the film during a certain length of time, the film is preferably not simply made dependent upon any timing device operating a shutter or diaphragm, but the opening and closing of the shutter is effected in dependence on the rotation of the optical equipment. This may take place electrically by closing or opening a relay, or mechanically by driving from the shaft 1 by means of a belt a regulator for controlling the time of exposure and which itself closes or opens the shutter located in front of the lens 16 or the compound lens member 17. The shaft 1 may simultaneously be driven from the motor by means of belt gear.

A simplification in regard to the optical system may be attained by dispensing with the stationary lens 16 and permitting the light of the arc lamp to fall directly on to the lens member 17. It is then necessary to bring the arc lamp closer to the apparatus, and also to place the lens member 17 so far away from the deflecting mirrors 20 and 34 respectively that a clear tracing of the point of light is obtained on the film.

In Fig. 4 of the drawings a bifilar oscillograph with stationary suspension or measuring loops is illustrated diagrammatically. To obtain an oscillation of the indicating light ray or beam 26 at right angles to the direction of motion of the optical system tracing the curves, it is necessary to interpose a reversing prism 36 between the loops and the likewise revolving deflecting mirror 35. The light is then likewise projected from the source of light 15 on to a lens 37 with shutter 38 whence it is thrown on the oscillograph mirror 21 in the bifilar suspension 23 by a deflecting mirror 22. The beam of light 26 then passes through the reversing prism 36 on to a revolving mirror 35 driven by the motor 14. The mirror 35 projects the ray of light 26 on to the cylindrical lens 4 which traces its oscillations on the film 5. In order to obtain the requisite reversal of the direction of oscillation with respect to the rotation in relation to the stationary loop, it is necessary to drive the reversing prism 36 with half the speed of the mirror 35. For this purpose it is necessary to interpose between the driving means for the mirror 35 and the reversing prism 36 of a speed-reducing gear 42. It is necessary that this gear should work absolutely correctly, which may be attained by an accurately finished mechanical gearing or by an electric transmission gear.

The additional advantage of this embodiment of my invention resides merely in the use of stationary loops with a system of electrically energized magnets, the accommodation of which in the rotating portion of the optical system would cause difficulties. For oscillographs with revolving loops permanent magnets are preferably chosen which enable very small and compact constructions. It has been ascertained that the high velocities obtainable with my improved apparatus have no adverse effect upon the bifilar suspension or measuring loop carrying the oscillograph mirror as regards the accuracy of indications since the centrifugal forces developing in the very light loops remain very low.

Since the film is stationary during the making of the oscillogram mechanical marking device may easily be applied to it and these records facilitate a quick analysis of the oscillograms.

Various structural modifications and changes may be made in my improved apparatus without departing from the spirit of my invention and the ambit of the appended claims.

I claim as my invention:

1. In an oscillograph of the type in which the oscillations to be measured are optically projected on to a film by a bifilar suspension upon which is mounted a mirror controlled by an alternating current field, a stationary sensitized film, and a revolving optical system.

2. In an oscillograph of the type in which the oscillations to be measured are optically projected on to a film by a bifilar suspension upon which is mounted a mirror controlled by an alternating current field, a stationary sensitized film wrapped around a drum, and an optical system revolving in said drum.

3. In an oscillograph of the type in which the oscillations to be measured are optically projected on to a film by a bifilar suspension upon which is mounted a mirror controlled by an alternating current field, a stationary sensitized film wrapped around a drum, and an optical system revolving in said drum, said bifilar suspension and the optical system located in a common housing, and a driving shaft journaled in said drum and upon which said housing is mounted so that said film is exposed to the light from the inside.

4. In an oscillograph of the type in which the oscillations to be measured are optically projected on to a film by a bifilar suspension upon which is mounted a mirror controlled by an alternating current field, a stationary sensitized film wrapped around a drum, and an optical system revolving in said drum, said bifilar suspension and the optical system located in a common housing, and a hollow driving shaft for the optical system journaled in said drum the axis of which is in alignment with the source of light and upon which said housing is mounted so that the film is exposed to the light from the inside.

5. In an oscillograph of the type in which the oscillations to be measured are optically projected on to a film by a bifilar suspension upon which is mounted a mirror controlled by an alternating current field, a stationary sensitized film wrapped around a drum, and an optical system revolving in said drum, said bifilar suspension and the optical system located in a common housing, and a hollow driving shaft for the optical system journaled in said drum the axis of which is in alignment with the source of light and upon which said housing is mounted so that the film is exposed to the light from the inside, a lens member with screen for producing bands of light and located in the inlet opening of said hollow shaft, and deflecting mirrors arranged to project the light on to the bifilar suspended oscillograph mirrors.

6. In an oscillograph of the type in which the oscillations to be measured are optically projected on to a film by a bifilar suspension upon which is mounted a mirror controlled by an alternating current field, a stationary sensitized film wrapped around a drum, and an optical system revolving in said drum, said bifilar suspension and the optical system located in a common housing, and a hollow driving shaft for the optical system journaled in said drum the axis of which is in alignment with the source of light and upon which said housing is mounted so that the film is exposed to the light from the inside, a lens member with screen for producing bands of light and located in the inlet opening of said hollow shaft, and deflecting mirrors arranged to project the light on to the bifilar suspended oscillograph mirrors, said deflecting mirrors located within said hollow shaft provided with corresponding recesses for permitting the passage of the rays of light.

7. In an oscillograph of the type in which the oscillations to be measured are optically projected on to a film by a bifilar suspension upon which is mounted a mirror controlled by an alternating current field, a stationary sensitized film wrapped around a drum, and an optical system revolving in said drum, said bifilar suspension and the optical system located in a common housing, and a hollow driving shaft for the optical system journaled in said drum the axis of which is in alignment with the source of light and upon which said housing is mounted so that the film is exposed to the light from the inside, a lens member with screen for producing bands of light and located in the inlet opening of said hollow shaft, and deflecting mirrors arranged to project the light on to the bifilar suspended oscillograph mirrors, said oscillograph mirrors located within said hollow shaft provided with corresponding recesses for permitting the passage of the rays of light, in order to provide equal paths for all bifilar suspensions.

8. In an oscillograph of the type in which the oscillations to be measured are optically projected on to a film by a bifilar suspension upon which is mounted a mirror controlled by an alternating current field, a stationary sensitized film wrapped around a drum, and an optical system revolving in said drum, stationary bifilar suspensions with mirrors, a revolving deflection mirror located in the axis of the drum, and a reversing prism adapted to revolve at half the speed of the mirror located between said deflection mirror and said measuring loops, for the purpose of reversing the direction of the oscillations during the rotation.

9. In an oscillograph of the type in which the oscillations to be measured are optically projected on to a film by a bifilar suspension upon which is mounted a mirror controlled by an alternating current field, a stationary tubular support for carrying a sensitized film, and an optical system revolving within said support.

10. In an oscillograph, a housing adapted to contain a stationary film in substantially cylindrical form, and means for causing a vibrating ray of light to rotate within said housing about the axis of the cylindrical film and to impinge on said stationary film within the housing, from the inner side of the film.

11. In an oscillograph, a normally stationary support for holding a film in substantially cylindrical form, means for causing a vibrating ray of light to rotate within said support about the axis of the cylindrical film and to impinge on said stationary film, from the inner side thereof, and a housing containing said film support.

12. In an oscillograph, a stationary housing, a normally stationary drum located in said housing and adapted to hold a film in substantially cylindrical form, and means for causing a vibrating ray of light to rotate within said drum about the axis of said drum and to impinge on the film from the inner side thereof.

In testimony whereof I affix my signature.

ERICH RIECKMANN.